United States Patent
Bauer et al.

(10) Patent No.: US 8,534,646 B2
(45) Date of Patent: Sep. 17, 2013

(54) SEAT SUSPENSION DEVICE FOR A VEHICLE SEAT

(75) Inventors: Rupert Bauer, Schmidgaden (DE); Nikolaus Haller, Ammerthal (DE); Johann Meier, Fensterbach (DE); Hubert Wittmann, Floss (DE)

(73) Assignee: Grammer AG (DE)

( * ) Notice: Subject to any disclaimer, the term of this patent is extended or adjusted under 35 U.S.C. 154(b) by 159 days.

(21) Appl. No.: 13/178,244

(22) Filed: Jul. 7, 2011

(65) Prior Publication Data

US 2012/0007293 A1   Jan. 12, 2012

(30) Foreign Application Priority Data

Jul. 8, 2010   (DE) .................. 10 2010 026 568

(51) Int. Cl.
*F16F 9/04* (2006.01)
*F16F 9/43* (2006.01)

(52) U.S. Cl.
USPC ...... 267/122; 267/133; 267/64.27; 267/64.28

(58) Field of Classification Search
USPC .......... 267/64.19, 64.21, 64.23, 64.24, 64.27, 267/117, 122, 131, 136, 64.28, 133; 248/550, 248/584, 588, 589
See application file for complete search history.

(56) References Cited

U.S. PATENT DOCUMENTS

| | | | |
|---|---|---|---|
| 2,489,981 A | 3/1946 | Rose | |
| 3,298,654 A * | 1/1967 | Dome | 248/567 |
| 4,022,411 A * | 5/1977 | Rumsey | 248/580 |
| 4,714,227 A | 12/1987 | Holm et al. | |
| 4,927,119 A * | 5/1990 | Frost | 248/550 |
| 4,954,051 A * | 9/1990 | Smith et al. | 248/631 |
| 5,553,911 A | 9/1996 | Bodin et al. | |
| 5,555,501 A | 9/1996 | Furihata et al. | |
| 5,899,288 A | 5/1999 | Schubert et al. | |
| 6,478,102 B1 | 11/2002 | Puterbaugh et al. | |
| 6,725,983 B2 * | 4/2004 | Bell | 267/64.28 |
| 6,758,294 B2 | 7/2004 | Peddycord et al. | |
| 6,773,049 B2 | 8/2004 | Rupiper et al. | |
| 7,077,226 B2 | 7/2006 | Oliver et al. | |
| 7,077,227 B2 | 7/2006 | Oliver et al. | |
| 7,240,754 B2 | 7/2007 | Barta et al. | |
| 7,300,100 B2 | 11/2007 | McLean et al. | |
| 7,331,627 B2 | 2/2008 | Van Den Brink et al. | |
| 7,744,149 B2 | 6/2010 | Murray et al. | |
| 7,882,914 B2 | 2/2011 | Scheele et al. | |
| 7,950,726 B2 | 5/2011 | Brown | |
| 7,997,600 B2 * | 8/2011 | Haller et al. | 280/124.157 |
| 8,095,268 B2 | 1/2012 | Parison et al. | |

(Continued)

FOREIGN PATENT DOCUMENTS

| | | |
|---|---|---|
| DE | 1480465 | 1/1970 |
| DE | 102005023088 | 6/2006 |

*Primary Examiner* — Thomas J Williams
(74) *Attorney, Agent, or Firm* — Sheridan Ross PC

(57) ABSTRACT

The invention relates to a seat suspension device for a vehicle seat, in particular a commercial vehicle seat, comprising at least one air spring, said air spring being disposed between an upper seat portion of the vehicle seat and a lower seat portion of the vehicle seat, and at least one hose-like member connected to the air spring via a first connection line for an extension volume of the air spring is provided, said hose-like member being arranged along at least one fold of a bellows-like facing extending between an upper seat portion and a lower seat portion of a vehicle seat.

11 Claims, 5 Drawing Sheets

(56) References Cited

U.S. PATENT DOCUMENTS

| | | |
|---|---|---|
| 8,182,038 B2 | 5/2012 | Haller |
| 8,186,475 B2 | 5/2012 | Sugden et al. |
| 8,225,903 B2 | 7/2012 | Dunn |
| 8,261,869 B2 | 9/2012 | Turco et al. |
| 8,265,832 B2 | 9/2012 | Haller et al. |
| 2005/0051373 A1 | 3/2005 | Bernhardt et al. |
| 2005/0224269 A1 | 10/2005 | Dahl |
| 2006/0237885 A1 | 10/2006 | Paillard et al. |
| 2009/0045000 A1 | 2/2009 | Brown |

* cited by examiner

SEAT SUSPENSION DEVICE FOR A VEHICLE SEAT

CROSS REFFERENCE TO RELATED APPLICATIONS

This application claims the benefit of German Application No. 102010026568.3 filed Jul. 8, 2010, the entire disclosure of which is incorporated herein by reference.

The present invention relates to a seat suspension device for a vehicle seat, in particular a commercial vehicle seat, including at least one air spring, said air spring being disposed between an upper seat portion and a lower seat portion of the vehicle seat.

From the prior art to date, damping devices for vehicle seats are known, which comprise a seat frame, a damper and an air spring. In the case of low seat heights and also in the case of heavy vehicle seats, the volume provided by the air spring only provides a limited vibration compensation effect. The vehicle seat is deflected from its central position and begins to swing. If the volume of the air spring is designed to be too low, too much pressure will be applied onto the air spring during high frequency vibrations, so that the air spring will topping out and/or bottom out, which will be perceived by the driver as a sharp jerk.

It is therefore the object of the present invention to provide a seat suspension device for vehicle seats, which provides a vibration compensation effect independent of the condition of the road surface, as a result of which the vehicle seat is not deflected from its initial position and therefore the height deflection is damped. Moreover, the present invention can be manufactured at low costs and is suitable for large volume production.

In respect of the device, this object is achieved by means of the features of Claim 1. Advantageous embodiments and developments are the subject matter of the dependent claims.

The concept of the present invention is to provide a seat suspension device according to the invention for a vehicle seat, in particular a commercial vehicle seat, comprising at least one air spring, said air spring being disposed between an upper seat portion and a lower seat portion of the vehicle seat and having at least one hose-like member for an extension volume of the air spring, which hose-like member is connected to the air spring via a first connection line. The hose-like member is disposed along at least one fold of a facing extending in a bellows-like manner between the upper seat portion and the lower seat portion of the vehicle seat. In this way, it is possible to arrange the extension volume for the air spring in such a way that no complex and bulky containers have to be provided in the bellows-like facing. Thus, the degree of freedom for the means provided for adjusting the seat height, such as for example the scissor-type frame or other lifting devices, is not restricted.

The hose-like member according to the invention, which is permanently connected in a controllable manner to the air spring via a first connection line, makes it possible to ensure a consistent damping of the height deflection of the vehicle seat in the case of both high frequency and low frequency vibrations, so that the vehicle seat will not be deflected from its central position no matter what vibrations act on it.

High frequency vibrations are preferably to be understood to mean short and sharp vibrations caused for example when driving over a pothole. Low frequency vibrations are preferably slow vibrations caused for example when driving over a slightly bumpy road surface.

With the design of the seat suspension device according to the invention, the effective piston area of the air spring may be kept as small as possible so as to minimise any frictional losses inside the spring. Therefore, in the subject matter according to the invention, air springs having a low force/displacement characteristic curve of the air spring may be used because the air spring can be returned to the centre position at any time owing to the minimisation of friction within the spring. Moreover, this allows more space for seat height adjustment mechanisms to be provided.

In the case of short and sharp vibrations, a small air spring volume is sufficient to ensure the height deflection of the vehicle seat to be damped. Due to the limited cross section of the first connection line which connects the air spring with the hose-like member, a counter-pressure is induced and the air volume exiting from the air spring experiences a resistance that acts to absorb the vibration caused. If the cross section of the first connection line were as large as the cross section of the hose-like member, the volumes of the air spring and of the hose-like member would be available for damping the height deflection of the vehicle seat, which in turn would cause a severe compression of the air distributed therein. Thus, the vehicle seat would experience a marked deflection.

In the case of slow vibrations, which may for example be caused by surface bumps, the first connection line receives the air displaced from the air spring at a slow rate, so that again the height deflection of the vehicle seat is damped.

In a further advantageous embodiment the fold is filled across its course either partially, but preferably completely, by the hose-like member, as a result of which a uniform extension of the air becomes possible.

In a further advantageous embodiment, the hose-like member extends over the run of a web with the greatest web height, with the bellows-like facing including a plurality of respectively two folds orientated parallel to each other, which folds are connected to each other by webs extending in the height direction. The bellows-like facing preferably has three webs designed in this way, wherein the central web advantageously has the greatest web height. The two adjacent webs above and below have a lower web height. The advantage of this preferred arrangement is that the web with the greatest web height provides room for the hose-like member which is designed to be variable in its cross section as a function of the extension volume for the air spring that is to be provided. Thus, a hose-like member having a large (small) extension volume also has a large (small) cross section.

In a further advantageous embodiment, the hose-like member is formed to be annular. As a result of this geometrical shape, the airflow will be divided upon application of pressure with air from the air spring and is therefore discharged more quickly from the first connection line, as a result of which particularly low frequency vibrations will be damped.

In a further advantageous embodiment, the hose-like member has a circular or polygonal, preferably quadrangular, cross section. The cross section of the hose-like member is preferably adapted to the geometric shape of the bellows-like facing. In the simplest case, the cross section of the hose-like member is formed to be round. Preferably, the hose-like member has a quadrangular cross section, as this allows the utilisation of space along the course of the web with the largest web height of the bellows-like facing to be maximised.

In a further advantageous embodiment, the hose-like member is preferably fixed to the bellows-like facing, preferably integrated in the bellows-like facing. The hose-like member is fixed to the bellows-like facing for example by gluing using a suitable adhesive or by heat sealing. It would also be conceivable for the hose-like member to be integrated as early as during the manufacturing of the bellows-like facing, so that no retrospective manual integration would be necessary.

In a further advantageous embodiment, the hose-like member would preferably be made from plastic. This may be a material that is either fully synthetic, partially synthetic or produced as a result of a conversion of natural products. The hose-like member is preferably made from an air-impermeable, dimensionally stable material such as for example polyvinylchloride, polyacrylates or polyurethanes. It would further be conceivable to add additives to the material, for example in order to stabilise it. Due to its dimensional stability with regard to pressure and temperature, the hose-like member will always provide a predeterminable extension volume independent of the environmental conditions, so that the height deflection of the vehicle seat will be consistently damped at all times.

In a further advantageous embodiment, a means for increasing the pressure in the air spring and/or in the hose-like member is disposed in the bellows-like facing between the upper seat portion and the lower seat portion of the vehicle seat. The means for increasing the pressure are preferably implemented as a compressor. This is advantageously used for an initial levelling of the vehicle seat as a function of the body weight of the driver sitting thereon. The compressor is preferably connected to the air spring via a second connection line. It would further be conceivable for the compressor to be connected directly to the air spring without a corresponding connection line.

If for example a person with a great body weight sits down, the vehicle seat will be deflected from its initial position (unoccupied condition) downwards, as a result of which the air spring will experience a pressure loading. If the driver were to drive over a pothole in this seating position, the high frequency vibrations caused would apply a further pressure loading onto the air spring, which would be perceived by the driver as a sharp jerk, because the remaining spring travel of the air spring would not be sufficiently long to dampen the vibrations caused. The compressor will therefore generate an additional air volume once the seat is occupied again, which will preferably bring the air spring into its central position.

The central position is to be understood to mean that high position of the air spring, in which the spring travel at the maximum deflection movement (compressive loading) corresponds to the spring travel at the maximum return movement (tensile loading). Since the air spring and the vehicle seat are connected to each other, a central position of the air spring will also mean a central position of the vehicle seat.

Moreover, it would be conceivable for the compressor to build up an additional air volume in the case of high frequency vibrations occurring, advantageously in the case of small air spring volumes, which additional air volume could be supplied to the air spring via a third connection line and would increase the air pressure there. When pressure is applied to the air spring, the increased air pressure will counteract a downward deflection, so that bottoming out will be prevented and the vehicle seat, and thus also the driver, will not experience a jerk. The compressor is preferably controlled via a control unit which, for example, evaluates signals from a vibration sensor attached to the vehicle seat and thus controls the compressor. This process preferably takes place automatically.

In a further advantageous embodiment, a valve for regulating the pressure in the air spring and/or in the hose-like member is mounted in the bellows-like facing between the upper seat portion and the lower seat portion of the vehicle seat. The valve is preferably implemented as an air valve and is advantageously used for an initial levelling of the vehicle seat as a function of the body weight of the driver sitting thereon. The valve is connected to the air spring via a third connection line.

If, for example, a person with a low body weight sits down on a vehicle seat that was previously adjusted for a person with a high body weight, the air spring will only experience a slight compressive loading. The seat is not in the central position, as a result of which there will be a risk, in the case of any vibrations occurring, that the short upward spring travel will cause a topping out and the driver experiences a jerk. The air valve thus discharges (?) the pressure from the air spring and/or also from the hose-like member into the environment and thus levels the air spring back into its central position.

It is further conceivable for the valve to control the pressure of the air spring and/or the hose-like member while the vehicle is travelling, and the valve is implemented for example as a pneumatic spring-return valve or as an electropneumatic valve made from a low-wear plastic or metal material. If the driver drives for example along a gravel path with potholes which cause high frequency vibrations, the compressor will initially generate an additional air volume and will supply this air volume to the air spring via a third connection line. As a result, a counter-pressure relative to the deflection motion of the air spring, which is caused by the high frequency vibration, is generated in the downward direction, so that the vibrations can be absorbed and damped. In this connection, the valve will control the pressure preferably in such a way that the damping achieved will not be excessively hard. If the driver subsequently drives along a tarmacked road with a surface that is only slightly bumpy, there will be a risk, due to the high pressure within the spring and/or the hose-like member, that the vehicle seat goes into resonant vibrations relative to the seat frame or the vehicle, as a result of which the low frequency vibrations acting on the vehicle seat are amplified. In this exemplary case, the valve is opened to release the air pressure in the seat suspension device and the damping effect is again enhanced.

A further advantageous embodiment is characterised in that an internal cross section of the first connection line is smaller at least in sections than an internal cross section of the hose-like member. If high frequency vibrations are caused, the compressor will generate an additional air volume because of the low air spring volume, which will initially flow into the air spring. Because of the smaller internal cross section of the first connection line compared to the hose-like member, this additionally provided air volume will only flow slowly into the hose-like member, so that the increased pressure in the air spring will disperse only slowly and the vibrations will be damped. If the internal cross section of the first connection line were the same as the internal cross section of the hose-like member, the volume of the air spring and the volume of the hose-like member would be regarded as a volume which would be substantially compressed during short and sharp vibrations and the vehicle seat would therefore be substantially deflected.

Moreover, it is also conceivable for the internal cross section of the first connection line to be greater than the internal cross section of the hose-like member, and in this case the volume of the first connection line would have to be added to the volume of the air spring.

In a further advantageous embodiment, the first connection line includes a throttle element for adjusting a flow cross section in the first connection line. The throttle element is advantageously implemented as a continuous valve so as to control the flow cross section of the air in the first connection line in a continuous manner.

In a further advantageous embodiment, the throttle element can be controlled by means of a control unit, the control parameters being predeterminable. The control unit preferably controls the throttle element as a function of the mass flow through the first connection line, and the control unit preferably evaluates signal data from at least one flow sensor and controls the throttle element as a function of the airflow.

It is further conceivable for the control unit to evaluate the signals of at least one vibration sensor which is mounted, for example, at the vehicle seat, and to control the position of the throttle element as a function of the type of vibrations caused (high frequency or low frequency) and thus to modify the flow cross section of the first connection line.

Further advantageous embodiments will be evident from the attached drawings, wherein:

FIG. 2b shows a cross section of a portion of a vehicle seat along the line A-A of FIG. 2a;

FIG. 3 shows a horizontal cross section of a seat suspension device according to the invention along the line B-B of FIG. 2a;

FIG. 4 shows a horizontal cross section of a further seat suspension device according to the invention along the line B-B of FIG. 2a.

Figure 1:
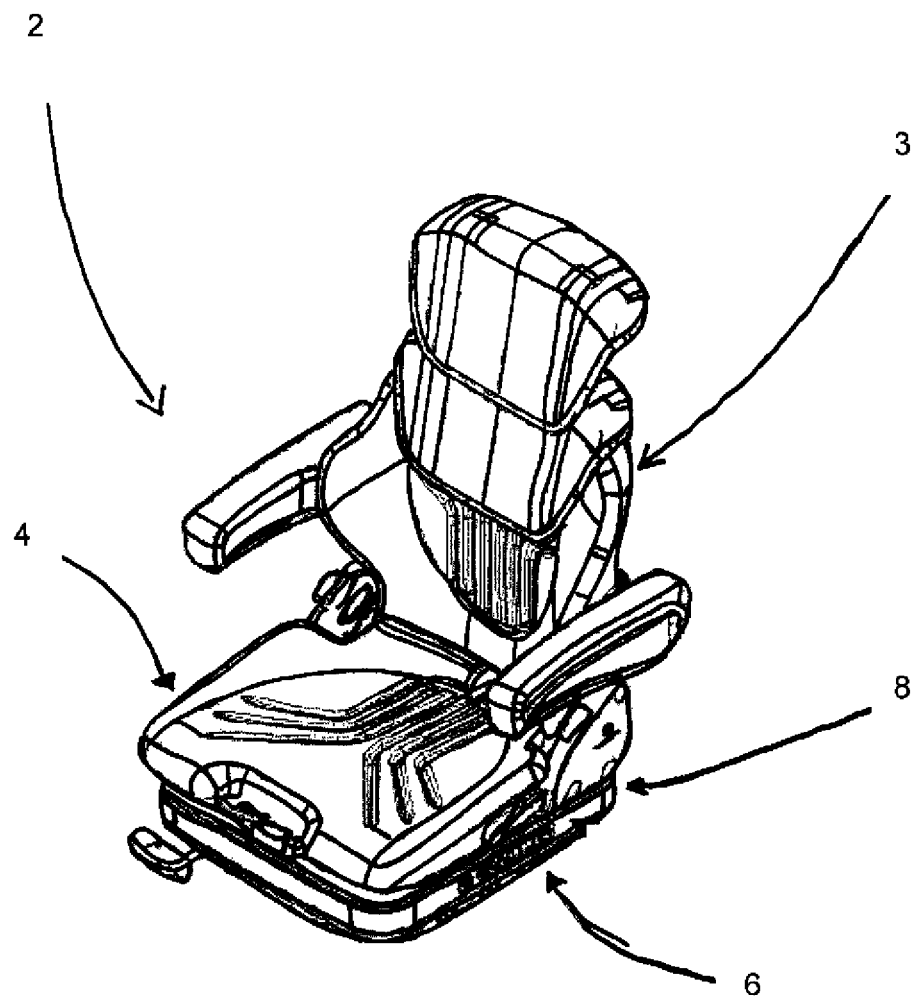
FIG. 1 shows a vehicle seat.

FIG. 1 shows a commercially available vehicle seat 2 comprising a backrest 3 and a bellows-like facing 8 disposed between an upper seat portion 4 and a lower seat portion 6.

Figure 2A:
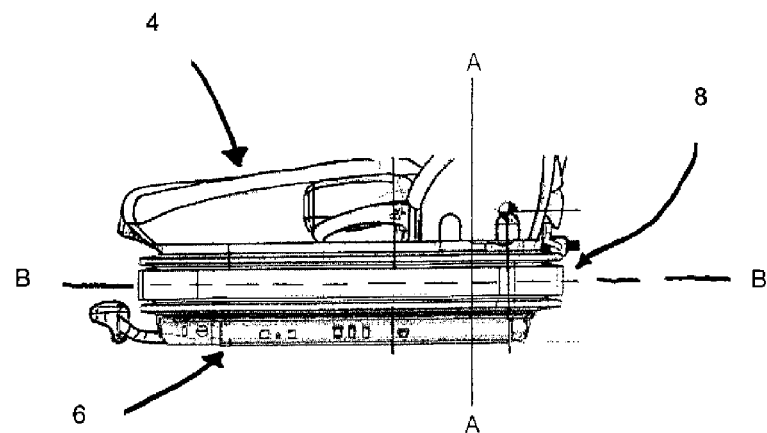
FIG. 2a shows a lateral view of a portion of a vehicle seat.
Figure 2B:
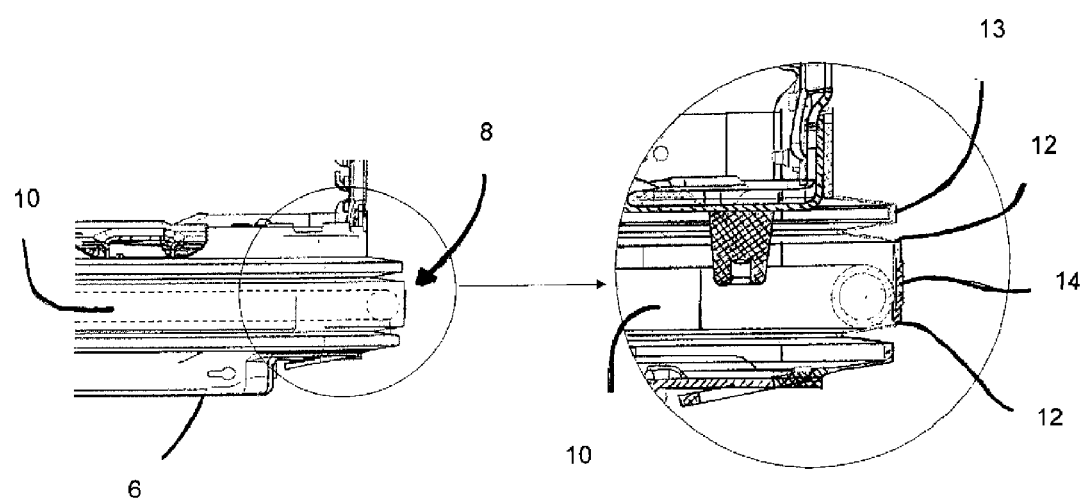

FIG. 2a shows part of a lateral view of the vehicle seat 2. FIG. 2b shows a cross section along the line A-A of FIG. 2a illustrating the course of the hose-like member 10 within the bellows-like facing 8. In this example, the hose-like member 10 is shown to be round, however, it may also have a cross section that differs from a round one. The enlarged view in the circular cut-out image shows additional details of the bellows-like facing 8. This has here three webs 13 extending in the height direction over various lengths, with the central web 14 having the greatest extension in the height direction. The webs 13 each connect two folds 12 oriented parallel to each other. The hose-like member 10 is preferably disposed in the central section of the bellows-like facing and has its greatest extension in the height direction, with the external cross section of the hose-like member 10 having to be selected to be smaller than or equal to the height of the web 14, so that the damping of the height adjustment is not restricted by an excessively large geometrical shape.

Figure 3:
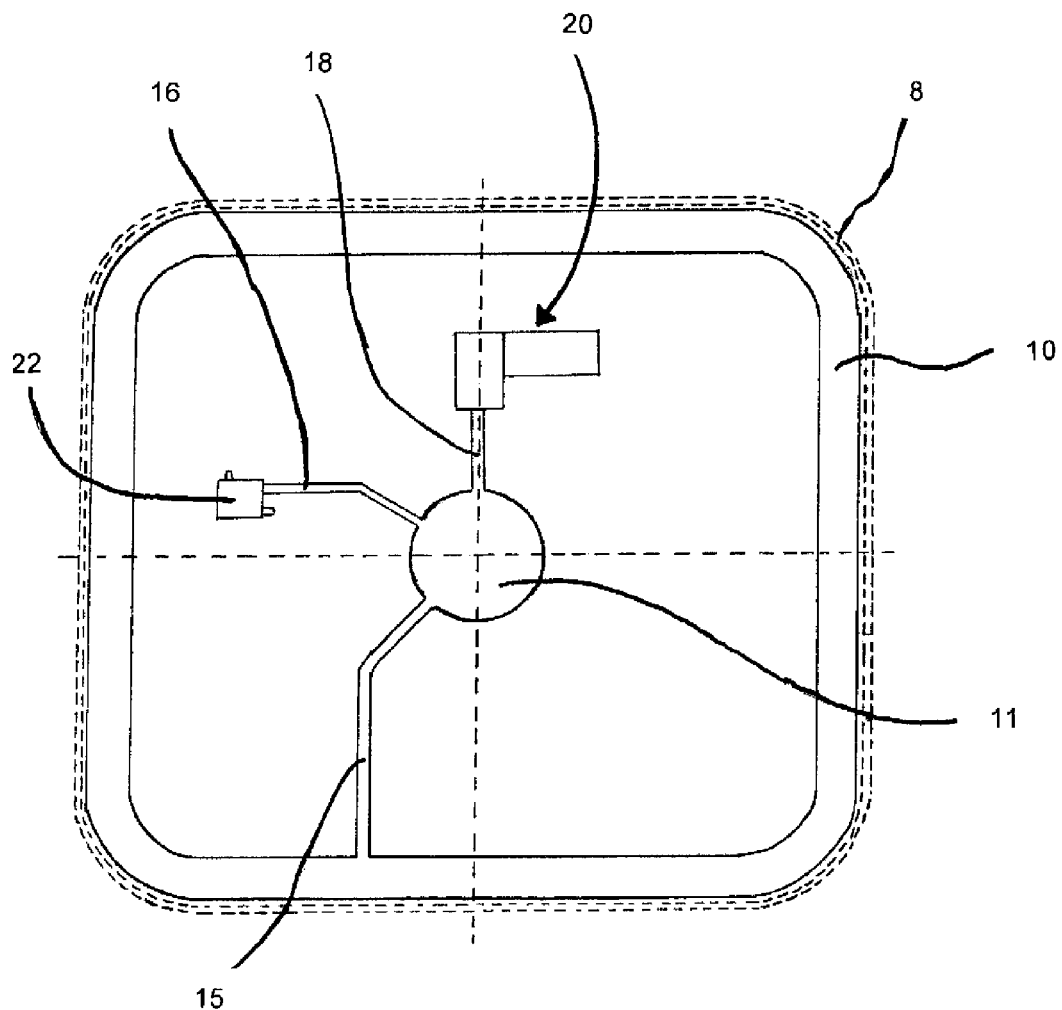

FIG. 3 shows a horizontal cross section along the line B-B of FIG. 2a. The seat suspension device 1 shown comprises an air spring 11 which is connected to the hose-like member 10 via a first connection line 15, a valve 22 which is connected to the air spring 11 via a second connection line 16 and a compressor 20 which is connected to the air spring via a third connection line 18. The hose-like member 10 is here formed to be annular and is disposed in the bellows-like facing 8. The connection to the air spring 11, which is height adjustable and can be subject to compressive and tensile loading, is provided via a first connection line 15.

Moreover, the air spring 11 is connected to a valve 22 for pressure control via a second connection line 16 and to a compressor 20 via a third connection line 18, all connection lines 15, 16 and 18 preferably being made from a flexible plastic material that is resistant to pressurised air. As a result of their movable design, the connection lines 15, 16, 18 can be arranged in the bellows-like facing 8 in a simple and space saving manner, so that there is no risk of the connection lines 15, 16, 18 being squeezed or jammed by any means provided for adjusting the seat height. The connection lines 15, 16, 18 are preferably fixed using suitable fastening elements such as, for example, cable ties, clamps or clips, in order to avoid the formation of loops or kinks in the connection lines or any airflow restrictions that might be accompanied therewith.

Prior to the start of a trip after the vehicle seat 2 has been newly occupied, the compressor 20 and the valve 22 are initially used for levelling the vehicle seat as a function of the body weight of the person sitting thereon. As soon as the person sits down on the vehicle seat 2, the air spring 11 experiences a compressive loading and is deflected downwards. The positioning of the vehicle seat 2 is carried out in such a way that the spring travel of the air spring has the same magnitude for both compressive loading and for tensile loading and the vehicle seat 2 is therefore also in a central position. This allows any vibrations caused for example by the road surface condition to be absorbed without causing the air spring to top out and/or to bottom out. This levelling process is preferably carried out automatically each time the vehicle seat 2 is newly occupied.

Whilst the vehicle is travelling, the compressor 20 and the valve 22 are permanently connected so that the damping of the vehicle seat 2 is adapted directly to any change of the road surface condition. If, for example, the driver drives over a pothole, pressure is applied to the air spring and the air spring is deflected downwards. After the pothole, the air spring 11 is deflected upwards and experiences a tensile loading. In order to dampen the height adjustment, the compressor 20 initially increases the pressure in the air spring 11 by means of an additional air volume in order to absorb the compressive loading of the air spring 11. If the air spring 11 experiences a tensile loading, the valve 22 will discharge the required air volume.

If high frequency vibrations are caused, the low air volume of the air spring 11 is often insufficient, the air spring 11 will bottom out and the driver will perceive a jerking of the spine. The compressor 22 therefore generates an additional air volume which is supplied to the air spring 11 via the third connection line 18. This air volume generates a counter-pressure in the air spring 11 in relation to the deflection of the air spring 11 which was caused by the vibration, so that the deflection movement is damped. To ensure that the damping is not too harsh, the valve 22 will open upon application of a pre-determinable pressure and any excess air will escape into the environment, as a result of which the pressure in the air spring 11 and/or the hose-like member 8 is reduced.

Moreover, the valve 22 preferably controls the air pressure in case the vibrations caused change from high frequency vibrations to low frequency vibrations. The discharge of air prevents the vehicle seat 2 from entering into resonance vibrations with the vehicle or the vehicle seat frame, as a result of which the low frequency vibrations occurring would be markedly amplified and the driver would be exposed to severe vibrations of the vehicle seat 2 both upwards and downwards.

Figure 4:
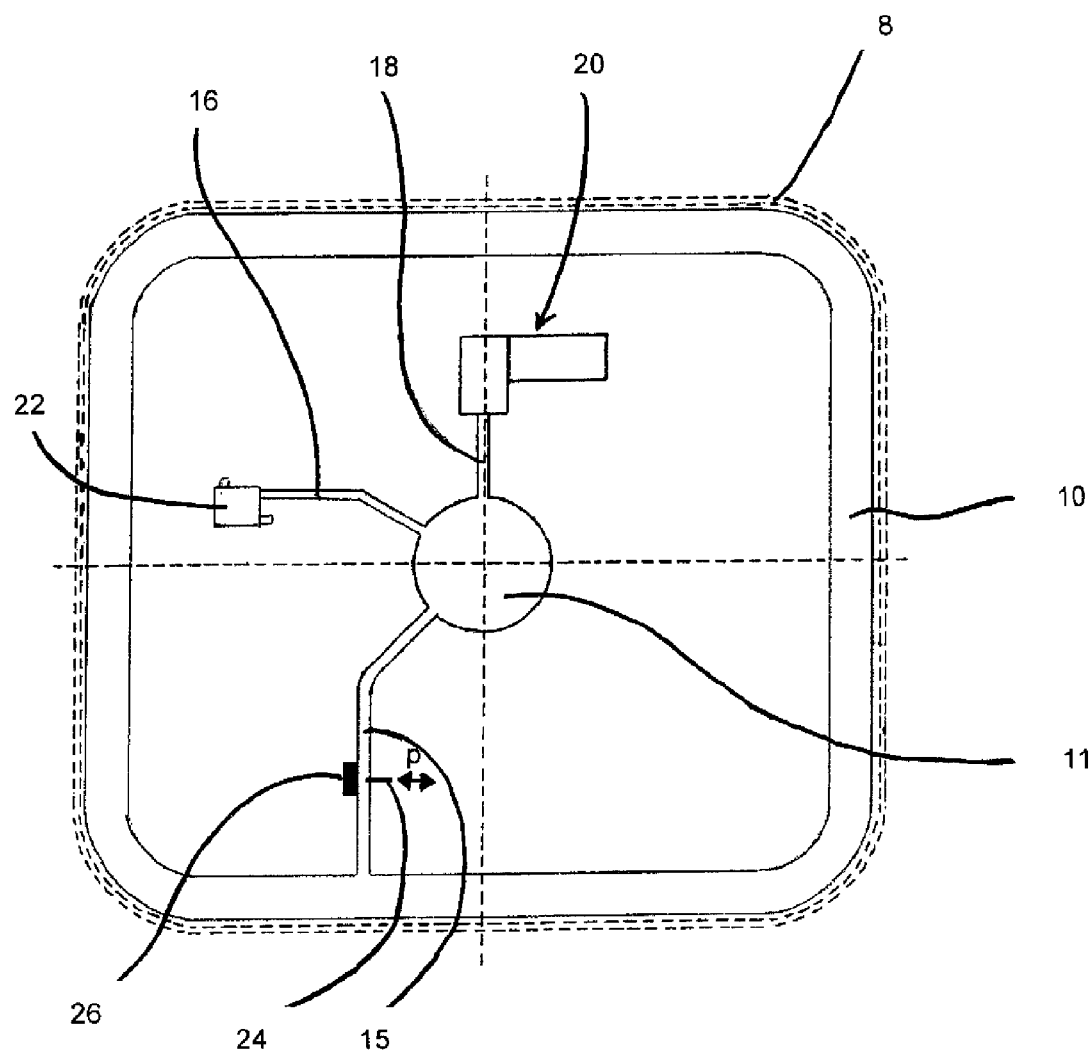

FIG. 4 shows a further embodiment of a seat suspension device 1 according to the invention, wherein the air spring is connected to the hose-like member 10 via a first connection line 15 and the first connection line 15 includes a throttle element 24, by means of which the flow cross section of the airflow in the first connection line 15 is controlled. The throttle element 24 is preferably formed as a continuous valve which can be controlled in a continuous manner in the direction of the arrow P. The throttle element 24 will, as a result of its geometrical form, not completely close the cross section of the first connection line 15, so that an airflow from the air spring 11 to the hose-like member 10 or vice versa is continuously ensured. This means that this is an open system.

Figure 5:
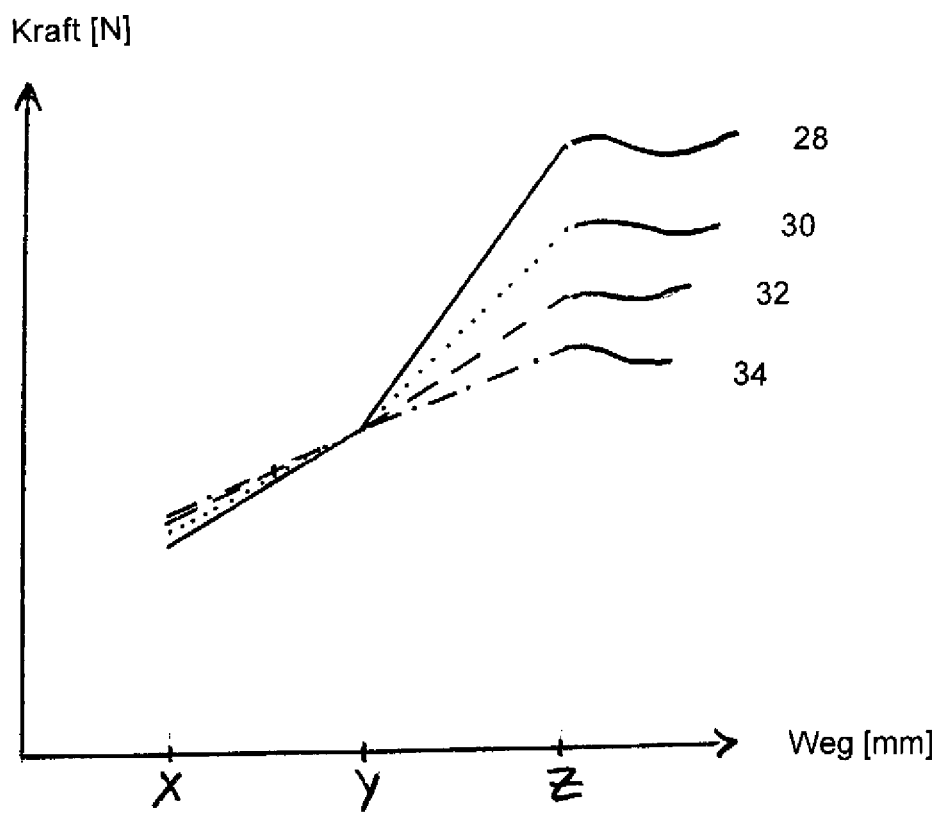
FIG. 5 shows a schematic diagram illustrating the force/displacement characteristic curve of the air spring of the seat suspension device in the case of different extension volumes.

FIG. 5 shows a diagram of the force/displacement characteristic curve of the air spring of the seat suspension device 1 in the case of extension volumes of various sizes of the hose-like member 10, which are respectively permanently associated with the volume of the air spring.

The abscissa reflects the height adjustment displacement of the air spring 11. The applied force represented on the ordinate corresponds to the lifting force of the air spring 11.

The force/displacement characteristics of the air spring were included for three different height adjustment travel values X, Y and Z, with X corresponding to the rebound condition of the air spring 11 and Z corresponding to the compressed condition of the air spring. The air spring characteristic 28 is the characteristic for the air spring 11 without an extension volume being provided. In the area XY, the air spring characteristic 28 shows a slight slope, since the volume of the air spring 11 is sufficient in the XY area of the height adjustment travel in order to dampen the vibrations caused. As the height adjustment travel increases in the area YZ, the force rapidly increases, which is indicated by the steeply rising graph section of the air spring characteristic 28 in the area YZ, which corresponds to a harsh damping.

If a first extension volume is permanently added to the volume of the air spring 11, the air spring characteristic 30 results, the slope of which only slightly increases in the area XY, and in the area YZ has a slope that is lower than that of the air spring characteristic 28 in the area YZ.

If a second extension volume instead of the first extension volume is permanently added to the volume of the air spring 11, said second extension volume being larger than said first extension volume, the lifting force of the air spring 11 will be reduced in the area YZ. This is represented by the air spring characteristic 32, the slope of which in the area YZ is lower than the slope of the air spring characteristic 30 in the area YZ and the slope of which is also lower than the slope of the air spring characteristic 28 in the area YZ.

If a third extension volume instead of the first or second extension volume is added to the volume of the air spring 11, which third extension volume is greater than the second extension volume and is thus also greater than the first extension volume, the lifting force of the air spring will be reduced even further, which is represented by the air spring characteristic 34. In the area YZ, the air spring characteristic 34 shows a lower slope than the air spring characteristic 32 in the area YZ and also a lower slope than the air spring characteristic 30 in the area YZ and also a lower slope than the air spring characteristic 28 in the area YZ. If the third extension volume is added to the volume of the air spring 11, the air spring characteristic 34 has a virtually unchanged slope in the areas XY and YZ.

The applicant reserves the right to claim all of the features disclosed in the application documents as being essential to the invention in as far as they are novel over the prior art either individually or in combination.

LIST OF REFERENCE NUMERALS

1 Seat suspension device
2 Vehicle seat
3 Backrest
4 Upper seat portion
6 Lower seat portion
8 Bellows-like facing
10 Hose-like member
11 Air spring
12 Fold
13 Web
14 Web with greatest web height
15 First connection line
16 Second connection line
18 Third connection line
20 Means for increasing pressure of the air spring 11
22 Valve
24 Throttle element
26 Control unit
28 Air spring characteristic
30 Air spring characteristic in the case of a first extension volume
32 Air spring characteristic in the case of a second extension volume
34 Air spring characteristic in the case of a third extension volume

The invention claimed is:

1. A seat suspension device for a vehicle seat, in particular a commercial vehicle seat, comprising:
    at least one air spring, said air spring being mounted between an upper seat portion of the vehicle seat and a lower seat portion of the vehicle seat;
    at least one hose member connected to the air spring via a first connection line for an extension volume of the air spring, said hose member being arranged along at least one fold of a bellows facing extending between the upper seat portion and the lower seat portion of the vehicle seat; and
    wherein a course of the fold is partially, preferably completely filled with said hose member.

2. The device as claimed in claim 1, wherein the first connection line includes a throttle element for adjusting a flow cross section in the first connection line.

3. The device as claimed in claim 1, wherein the hose member extends along a course of a web with the greatest web height, with the bellows facing including two folds orientated parallel to each other, wherein the folds are connected to each other via webs extending in the height direction.

4. The device as claimed in claim 1, wherein said hose member is annularly formed.

5. The device as claimed in claim 1, wherein the hose member has a circular or polygonal, preferably a quadrangular, cross section.

6. The device as claimed in claim 1, wherein the hose member is fixed to the bellows facing, and is preferably integrated into the bellows facing.

7. The device as claimed in claim 1, wherein the hose member is preferably made from plastic.

8. The device as claimed in claim 1, wherein a valve for controlling the pressure in the air spring and/or in the hose member is mounted in the bellows facing between the upper seat portion and the lower seat portion of the vehicle seat.

9. The device as claimed in claim 1, wherein an internal cross section of the first connection line is smaller at least in sections than an internal cross section of the hose member.

10. The device as claimed in claim 9, wherein a throttle element of the first connection line can be controlled by means of a control unit.

11. A seat suspension device for a vehicle seat, in particular a commercial vehicle seat, comprising:
    at least one air spring, said air spring being mounted between an upper seat portion of the vehicle seat and a lower seat portion of the vehicle seat;
    at least one hose member connected to the air spring via a first connection line for an extension volume of the air spring, said hose member being arranged along at least one fold of a bellows facing extending between the upper seat portion and the lower seat portion of the vehicle seat; and wherein a means for increasing a pressure in the air spring and/or in the hose member is mounted in the bellows facing between the upper seat portion and the lower seat portion of the vehicle seat.

* * * * *